Dec. 21, 1948.  K. Y. ÖHMAN  2,456,728
LENS SYSTEM WITH CHROMATIC ABERRATION AND
WITHOUT NOTICABLE MAGNIFICATION
Filed Aug. 30, 1944
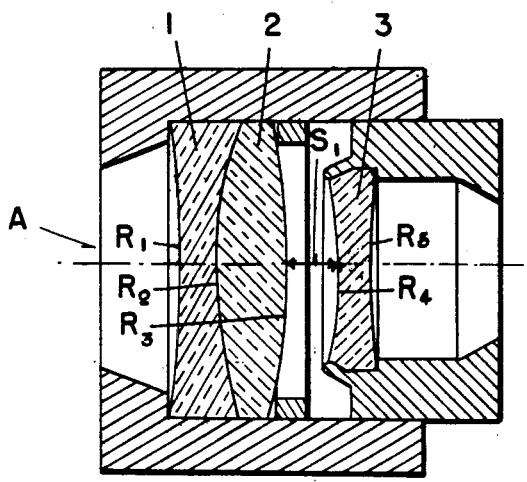
Inventor
KARL Y. OHMAN,
By E. F. Wenderoth
ATTORNEY Patented Dec. 21, 1948

2,456,728

UNITED STATES PATENT OFFICE 2,456,728

LENS SYSTEM WITH CHROMATIC ABERRATION AND WITHOUT NOTICEABLE MAGNIFICATION

Karl Yngve Öhman, Saltsjobaden, Sweden, assignor to Svenska Ackumulator Aktiebolaget Jungner, Stockholm, Sweden, a corporation of Sweden Application August 30, 1944, Serial No. 551,878
In Sweden October 15, 1943

4 Claims. (Cl. 88—57)

The present invention refers to a lens system for enabling objects situated at different ranges from the eye to be simultaneously focused, the said system being useful as e. g. a telescopic sight without noticeable magnification for facilitating the directing of a fire-arm. This invention is based on the well known fact that the optical image as formed by the lenses is often influenced by chromatic aberration and on the fact that the human eye is able to favour that colour which gives the best image. Whilst it is desirous to reduce the chromatic aberration to a minimum when constructing an ordinary telescope or field glasses, the chromatic aberration is utilized in the present invention in such a way that it is possible for the eye simultaneously to detect well defined although somewhat differently coloured images of both distant and near objects e. g. the target and the sights on the barrel of the fire-arm.

The invention is of great importance when directing a fire-arm. So far it has only been possible to realize an optically satisfactory sight device by means of a telescopic sight. The eye cannot at the same time focus both the target and an ordinary sight distinctly without auxiliary optical means limiting the pencil of rays. This is especially the case if the accommodating faculty of the eye is somewhat below normal which must needs result in faulty pointing. Elderly persons are therefore obliged to use a diaphragm before the eye or a dioptic sight. The present invention is superior to ordinary shooting glasses with diaphragm means or a dioptic sight fixed to the fire-arm in so far as an actual focusing of both the target and the sight may simultaneously take place, besides which the whole pupil of the eye or the essential part of it is utilized. In other words the intensity of light is reduced only by a negligible amount. Compared with the usual dioptic sight fixed on a fire-arm the new system according to the invention gives a wider field of view.

In order to achieve the effect described above it is generally necessary for the lens system to comprise two or more lenses. Also a single double-convex lens of a material with pronounced light dispersing qualities may, however, be used if the lens is of such thickness or curvature that it acts as an astronomical telescope. The images will however then be inverted.

In such cases where two lenses are employed, one thereof, 2 in the drawing, should be positive, the other, 1 in the drawing, negative. On account of the fact that the red and the yellow rays are least absorbed by the atmosphere and as it is an advantage to obtain a sharply defined image of a distant object in so large a spectral region as possible, the positive lens is preferably made of glass with great dispersive power (small Abbe number) e. g. flint-glass, whereas the negative lens is preferably made of glass with but little dispersive power (large Abbe number) e. g. crown-glass. As may easily be proved such a system may be made non-focal in respect of e. g. orange coloured light but be given a focal length of e. g. 80 cm. for blue light.

If such a system of lenses is used as a shooting glass it ought preferably to be positioned on the fire-arm proper at a relatively short distance from the eye of the shooter. For a person with normal sight it is then possible to discern sharply defined images of the target and of the sight through the shooting glass. The target will be conspicuous and sharply defined in orange and colours similar thereto, the remaining sorts of colours not substantially blurring the image. On the other hand the fore-sight will stand out sharply defined in the blue light.

Besides the simultaneous sharp definition of target and the fore-sight the system according to the invention with the new shooting lens system fixed onto the fire-arm produces another very great advantage. As both the target and the fore-sight, when seen through the chromatic lens system seem to lie at an infinite distance, they appear without noticeable parallax if the eye is moved somewhat laterally behind the lens system. This means that it is more important for the person aiming to take care that the fore-sight exactly coincides with the target than to take care that the fore-sight appears exactly in the center of the lens system. In order to increase the sharpness of objects viewed through the lens system it is preferable to reduce the aperture A of the latter to 4 mm. or less.

In order to attain the above described considerable colour dispersion one must have lenses of pronounced curvature. It is therefore often an advantage to use three or more lenses instead of only two.

In order that the invention may be easily understood and readily put into effect a preferred embodiment thereof will now be described, reference being had to the accompanying drawing.

The drawing figure illustrates by way of example an enlarged view of a shooting glass comprising three lenses of which the middle lens 2 is a double-convex flint-glass lens (SF 11, Schott u.

Gen.) with radii of $R_2$, $R_3$ of 22.18 mm. each and the two other lenses 1 and 3 are identical double-concave crown-glass lenses (PSK 3 Schott u. Gen.) with radii $R_1$ and $R_5$ of 48.09 and $R_4$ of 22.18 mm. When the surfaces of the various lenses are brought into contact with one another they represent the symmetric system −1.25 dioptrics in the orange coloured spectral sphere. If, however, the two foremost lenses 1 and 2 are cemented to an objective and the back lens 3 is removed, as at $S_1$, 1.5 mm. from the flint-glass lens 2 the system then has the character of opera glasses with negligible enlargement, which is focused to infinity in orange coloured light but which simultaneously permits the focusing in blue light of objects distanced only about 80 cm. away. By adjusting the back lens, which also has the character of an eye piece, slight hypometropia or myopia of the person aiming may be corrected or counterbalanced. Also the wave length ranges may be somewhat modified in order to be accommodated better to various conditions of light.

It may seem curious that a shooting glass built up on the utilization of chromatic aberration should be advantageous for precision shooting. It is especially on account of this fact, that the accommodating movements of the eye may be dispensed with that accuracy and quickness in aiming are increased. The fact that the position of only one of the sights (the fore-sight) requires to be accurately laid on when the shooting lens-system is mounted on the fire-arm also attributes to this fact.

Experience has shown that the eye very quickly accustoms itself to the new sight means and easily disregards the disturbing colour effects. In this conjunction it might be pointed out that astigmatic defects are not uncommon occurrences among good marksmen. Whilst the marksman in such cases may utilize his astigmatism for simultaneously fixing the target and the sight, the new shooting glass or lens-system may be said to give the eye a more pronounced artificial chromatic defect which considerably facilitates the pointing or aiming operation. Also lenses of double refracting material may possibly be used for this purpose but such shooting lens-systems would be rather expensive in production, which is not the case with the chromatic shooting glass or lens-system.

What I claim and desire to secure by Letters Patent is:

1. A shooting glass consisting of a lens system comprising at least one positive lens of high focal power and at least one negative lens with principally the same focal power as that of the positive lens or lenses for a certain wavelength of visible light and with about 1.25 dioptric less focal power as that of the positive lens for another wavelength of visible light, said positive and negative lenses being placed at a distance from each other which is small compared with the focal length of any of the lenses.

2. A shooting glass consisting of a lens system comprising at least one positive lens of high focal power and at least one negative lens with principally the same focal power as that of the positive lens or lenses for orange light and with about 1.25 dioptric less focal power as that of the positive lens for blue light, said positive and negative lenses being placed at a distance from each other which is small compared with the focal length of any of the lenses.

3. A shooting glass consisting of a lens system comprising at least one positive lens of high focal power and at least one negative lens with principally the same focal power as that of the positive lens or lenses for orange light and with about 1.25 dioptric less focal power as that of the positive lens for blue light, said positive and negative lenses being placed at a distance from each other which is small compared with the focal length of any of the lenses and with an aperture of about 4 mm.

4. A shooting glass consisting of a lens system comprising a double concave lens having a first surface radius of 48.09 mm. and a second surface radius of 22.18 mm., a double convex lens having surface radii of 22.18 mm. in contact with said second surface of said concave lens, a second double concave lens having a first surface radius of 22.18 mm. and a second surface radius of 48.09 mm., said second concave lens being spaced from said convex lens approximately 1.5 mm., said lenses comprising a positive lens of high focal power and negative lenses of principally the same focal power as that of the positive lens for a certain wave length of visible light and with about 1.25 dioptric less focal power as that of the positive lens for another wave length of visible light, said lenses being placed at a distance from each other which is small compared with the focal length of any of said lenses, and with an aperture of about 4 mm.

KARL YNGVE ÖHMAN.

REFERENCES CITED

The following references are of record in the file of this patent:

UNITED STATES PATENTS

| Number | Name | Date |
| --- | --- | --- |
| 409,981 | Krogmann | Aug. 27, 1889 |
| 492,335 | Parvin | Feb. 21, 1893 |
| 635,473 | Goerz et al. | Oct. 24, 1899 |
| 775,353 | Von Rohr | Nov. 22, 1904 |
| 853,812 | Lomb | May 14, 1907 |
| 1,197,742 | Kellner | Sept. 12, 1916 |
| 1,553,211 | Barr et al. | Sept. 8, 1925 |

FOREIGN PATENTS

| Number | Country | Date |
| --- | --- | --- |
| 17,832 | Great Britain | 1899 |
| 27,493 | Austria | Feb. 25, 1907 |
| 26,085 | France | Apr. 10, 1923 |
| | Addition to 517,014 | |
| 212,559 | Great Britain | July 24, 1924 |